United States Patent [19]
Okuda

[11] 3,913,187
[45] Oct. 21, 1975

[54] SQUEEZE-ACTION CLAMP
[75] Inventor: Seizi Okuda, Sagamihara, Japan
[73] Assignee: Nifco Inc., Tokyo, Japan
[22] Filed: Oct. 15, 1974
[21] Appl. No.: 514,727

[30] Foreign Application Priority Data
Oct. 18, 1973 Japan.............. 48-120222

[52] U.S. Cl. ................................. 24/255
[51] Int. Cl.² ........................... A44B 21/00
[58] Field of Search ........... 24/255 SL, 16 PB, 844, 24/137, 714; 248/230, 49

[56] References Cited
UNITED STATES PATENTS

| | | | |
|---|---|---|---|
| 1,992,322 | 2/1935 | Nulf et al. ......................... | 248/230 |
| 2,908,469 | 10/1959 | Mack et al. ........................ | 248/230 |
| 3,167,292 | 1/1965 | Meyerowitz ...................... | 248/230 |
| 3,350,044 | 10/1967 | Zulauf............................... | 248/49 |
| 3,425,389 | 2/1969 | Sacco et al. .................. | 24/255 P X |
| 3,483,285 | 12/1969 | Foley ............................. | 24/16 PB |
| 3,516,631 | 6/1930 | Santucci........................... | 24/16 PB |
| 3,517,702 | 6/1970 | Mueller............................. | 24/16 PB |
| 3,629,912 | 12/1971 | Klopp............................ | 24/255 SL |
| 3,809,371 | 5/1974 | Martini.......................... | 24/255 SL |

FOREIGN PATENTS OR APPLICATIONS
446,655   6/1927   Germany .......................... 248/230

Primary Examiner—Paul R. Gilliam
Assistant Examiner—Doris L. Troutman
Attorney, Agent, or Firm—Robert W. Beart; Jack R. Halvorsen

[57] ABSTRACT

Disclosed is an improved squeeze-action clamp which is molded from thermoplastic synthetic resin as two semicircular halves resiliently hinged together at one end and having joint portions at each of the other ends thereof and which is characterized in that the inner surfaces of the halves have thereon a plurality of resilient auxiliary supporting members for resiliently hugging an object at the inside of an annulus completed by engaging the joint portions.

2 Claims, 3 Drawing Figures

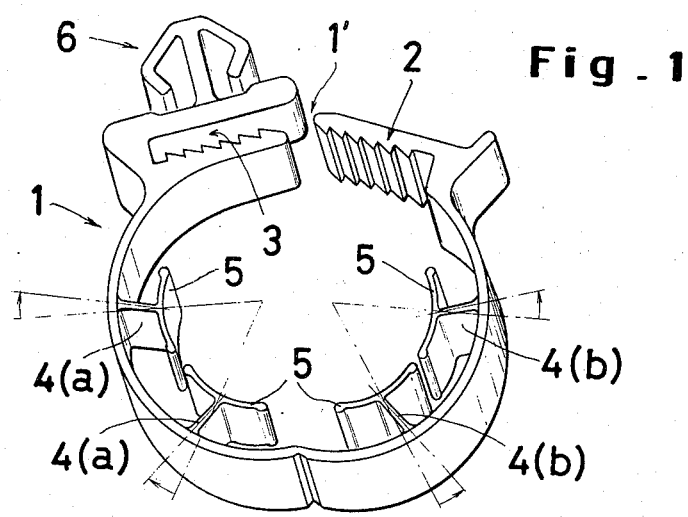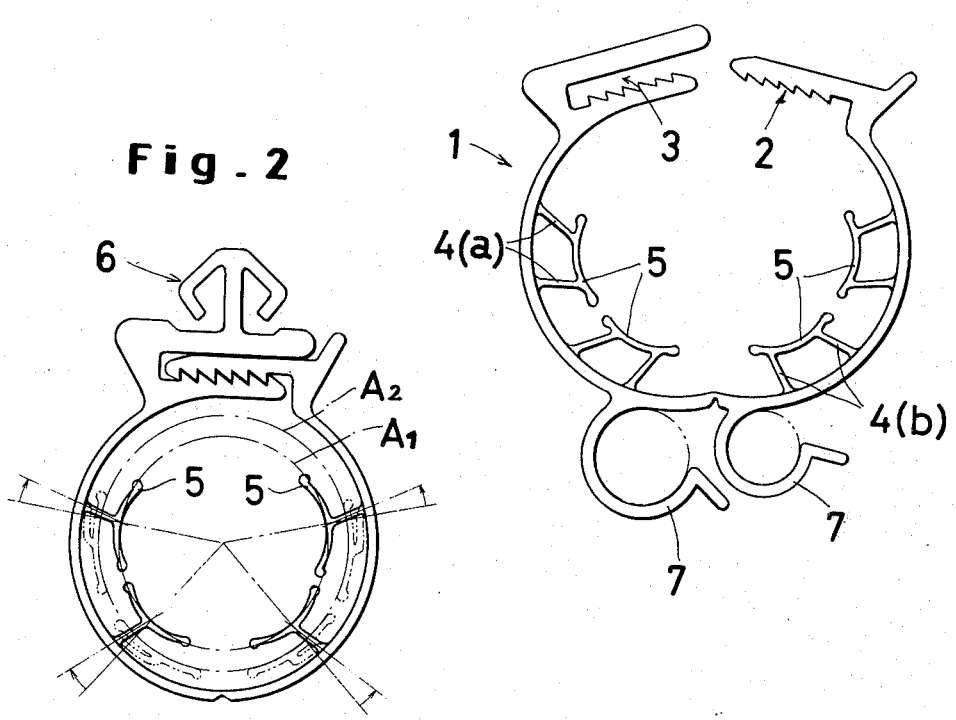

SQUEEZE-ACTION CLAMP

BACKGROUND OF THE INVENTION

The present invention relates to an improvement in a squeeze-action clamp formed integrally from thermoplastic synthetic resin such as polypropylene or nylon 6, which, when molded, provides a suitable rigidity and resiliency. The clamp is formed as two hinged semicircular halves having joint portions at the ends thereof for tightly hugging an object such as a hose, pipe, bundle of electric conductors or rod within an annulus formed by engaging the joint portions.

Squeezing or hugging type plastic clamps have been used to clamp wires and/or pipes installed in buildings, cars etc.. A typical example of such a clamp comprises two resiliently hinged semicircular halves having joint portions at the ends thereof which, when engaged with each other, complete an annular clamp within which an object such as a bundle of wires, pipe etc. is tightly squeezed. The clamp further comprises an anchor portion by which it is anchored to a supporting structure.

In such conventional clamp, the regulation of clamp size, i.e., the internal area thereof, to accommodate it to various sizes of pipe to be clamped thereby is performed by changing the engaging depth of the joint portions. That is, when a pipe having relatively large diameter is to be clamped, the engaging depth is made shallow and, when a relatively thin pipe is to be clamped, the depth is made deep. Therefore, the larger the pipe is the less the squeezing stability. In addition, a pipe whose diameter is smaller than the inner diameter of the annulus completed by fully engaging the joint portions cannot be held tightly and undesired movement of the pipe in the clamp results. Furthermore, since the conventional clamp hugs the object by the inner surface thereof directly, any shock or vibration acting on the clamp is directly transmitted to the object.

SUMMARY OF THE INVENTION

The object of the present invention is to eliminate the disadvantages of the conventional clamp.

The above object of the present invention is achieved by providing an improvement of the conventional squeeze-action clamp. The improvement includes the provision of a plurality of resilient auxiliary supporting members on the inner surface of the clamp. The auxiliary supporting members are adapted to squeezingly hold objects of various diameters within the clamp without the regulation of the engaging depth of the joint portions thereof and serve as shock absorbers.

BRIEF DESCRIPTION OF DRAWING

FIG. 1 is a perspective illustration of an embodiment of the present squeeze-action clamp in the open state;

FIG. 2 is a plane view of the clamp in the closed state; and

FIG. 3 shows a modification of the auxiliary supporting members.

DETAILED EXPLANATION OF THE INVENTION

FIG. 1 is a perspective illustration of an embodiment of the present clamp in the open state. The clamp is molded integrally from thermoplastic material such as polypropylene or nylon 6 which, when molded, provides suitable rigidity and resiliency. The clamp comprises an annular body 1 having a suitable width, a suitable wall thickness and a relatively thin wall portion which serves as a hinge. Therefore, the body 1 can be considered as comprised of two semicircular halves hinged at one end thereof. One of the free ends of the halves is provided with a male joint portion 2 having a row of ramp teeth on the inner surface thereof and the other free end is provided with a female joint portion 3 having a corresponding row of opposing ramp teeth. The joint portions 2 and 3, when engaged, prevent the body 1 from opening.

An object such as pipe, cable, a bundle of wires etc. which is to be squeezed by the clamp is inserted through a gap 1' between the joint portions 2 and 3 into the interior of the circular body 1 and is embraced tightly by inserting the joint portion 2 into the joint portions 3 as in the conventional clamp. As mentioned previously, in the conventional clamp, the depth by which the joint portions 2 and 3 are overlapped, i.e., the number of teeth engaged, is determined according to the diameter of the pipe so as to directly squeeze the pipe by the inner surface of the body 1.

The clamp according to the present invention is formed in the inner surface of the body 1 with a plurality, for example, four in the illustrated embodiment, of suitably spaced generally T-shaped auxiliary support members. Each auxiliary support member includes an auxiliary piece 5 and a leg 4 connecting the piece 5 to the inner surface of the body 1. The thicknesses of the leg 4 and the piece 5 are made relatively small to give a suitable resiliency thereto.

A suitable inward curvature is given to the piece 5, which is larger than that of the annulus of the body 1 to enhance the squeezing property of the piece 5 with respect to the pipe put in the body 1. That is, the pipe received by the auxiliary supporting members is resiliently squeezed by the members when the joint portions 2 and 3 are engaged.

Therefore as shown in FIG. 2 it is possible to reliably squeeze and hold pipes ranging in diameter from $A_1$, in which case the pipe is supported by the resiliency of the curved pieces 5 and the rigidity of the legs 4, to $A_2$, in which case the legs 4 are almost completely deformed. This diameter range may be expanded by further utilizing the conventional regulation, i.e., the regulation of the engaging depth of the joint portions 2 and 3.

Since the pipe is resiliently hugged by the auxiliary supporting members including the legs 4 and the pieces 5, any shock or vibration acting on the body 1 is damped by the legs 4 and is not directly transmitted to the pipe. The reverse is also true.

For this reason, the present clamp may be effectively used in securing an object such as a brake-oil hose or fuel hose to, for example, an automobile body.

The clamp shown in FIG. 1 and FIG. 2 further comprises an anchor leg 6 adapted to be anchored to an opening in the automobile body etc. to secure the body 1 thereto. The shown configuration of the anchor leg is a mere example, and any other configurations may be used as the circumstances dictate. The position of the body 1 at which the anchor leg 6 is formed is not limited to that shown in FIG. 1 or FIG. 2. It can be provided at any other position on the outer periphery of the body 1, provided that the anchor leg formed does not interfere with the operation of the joint portions 2 and 3.

FIG. 3 shows another embodiment of the present invention. This embodiment is different from the clamp in FIG. 1 or FIG. 2 in that the anchor leg 6 is omitted and, instead, members 7 are formed at substantially opposite position to the joint portions 2 and 3 and that each of the auxiliary supporting members is generally $\pi$-shaped, the top and legs of the $\pi$ respectively being a piece 5 similar to the piece 5 in FIG. 1 or FIG. 2 and two legs 4 each similar to the leg 4 in FIG. 1 or FIG. 2.

Each of the members 7 is circular with an open portion and is adapted to secure the body 1 to a suitable support structure or to resiliently hold any elongated object therein. In the latter case, it may be preferrable also to provide an anchor such as the anchor 6 in FIG. 1 or FIG. 2.

In the clamps in FIG. 1 and FIG. 3, the resiliency of the single leg 4 or the parallel legs 4 for resiliently supporting each of the pieces 5 should be sufficient to highly squeeze the pipe through the piece 5. In order to achieve this requirement, the leg or legs associated with each piece 5 are made slightly inclined away from the radial direction of the body 1.

It has been found that if the legs 4 of the body 1 are inclined in a common direction, i.e., clockwise or anticlockwise, the pipe received in the body 1 has a tendency to rotate in that direction with the closing of the joint portions 2 and 3. In order to avoid this tendency, the inclination of the legs 4 should be either reversed alternately or, as shown in FIG. 1 to FIG. 3, the legs 4a in one of the halves of the body 1 should be inclined in one direction and those 4b in the other half should be inclined in the opposite direction.

What is claimed is:

1. In a squeeze-action clamp for squeezing a complementary object therein comprising an integrally formed annular body having two semicircular halves resiliently hinged together at one end, and complementary fastener portions formed at the free ends of each of said semicircular halves adapted to lockingly cooperate when the annular body is collapsed, a plurality of integral flexible clamping members provided on the inner surfaces of each of said halves, said integral flexible clamping members each providing a clamping surface portion spaced from the inner surface of each of said halves by a flexible supporting leg; said legs are inclined relative to a radial line passing through their paint of support with said clamping surface portion which provides a broad latitude a to the size of objects to be resiliently embraced thus giving said legs a directional bias whereby upon insertion of a complementary object between said semicircular halves and locking of said complementary fastener portions the clamp resiliently squeezes the object within said annular body.

2. An improved clamp as set forth in claim 1 wherein said legs and supporting surfaces provided on the inner surface of one of said halves are inclined in one direction and said legs provided on the inner surface of the other half are inclined in the opposite direction.

* * * * *